United States Patent [19]

Fasching et al.

[11] Patent Number: 4,523,465
[45] Date of Patent: Jun. 18, 1985

[54] WIRELESS REMOTE LIQUID LEVEL DETECTOR AND INDICATOR FOR WELL TESTING

[75] Inventors: George E. Fasching, Morgantown, W. Va.; Donald M. Evans, Point Marion, Pa.; John H. Ernest, Morgantown, W. Va.

[73] Assignee: The United States of America as represented by the United States Department of Energy, Washington, D.C.

[21] Appl. No.: 569,087

[22] Filed: Jan. 9, 1984

[51] Int. Cl.³ .................. G01F 23/22; G08B 21/00
[52] U.S. Cl. .............................. 73/290 V; 73/304 R; 340/860; 367/908
[58] Field of Search .............. 73/290 V, 304 R; 340/620, 621, 860; 367/908, 903

[56] References Cited

U.S. PATENT DOCUMENTS

| 3,255,882 | 6/1966 | McCarty et al. | 73/304 R X |
| 3,668,630 | 6/1972 | Radin et al. | 340/620 X |
| 3,781,783 | 12/1973 | Tucker | 340/860 |
| 3,909,948 | 10/1975 | Markfelt | 340/620 X |
| 4,123,753 | 10/1978 | Gravert | 340/621 |
| 4,279,078 | 7/1981 | Hinshaw et al. | 340/620 X |

FOREIGN PATENT DOCUMENTS 560144  7/1977  U.S.S.R. .................. 73/290 V

Primary Examiner—Daniel M. Yasich
Attorney, Agent, or Firm—David E. Breeden; Stephen D. Hamel; Judson R. Hightower

[57] ABSTRACT

An acoustic system is provided for measuring the fluid level in oil, gas or water wells under pressure conditions that does not require an electrical link to the surface for level detection. A battery powered sound transmitter is integrated with a liquid sensor in the form of a conductivity probe, enclosed in a sealed housing which is lowered into a well by means of a wire line reel assembly. The sound transmitter generates an intense identifiable acoustic emission when the sensor contacts liquid in the well. The acoustic emissions propagate up the well which functions as a waveguide and are detected by an acoustic transducer. The output signal from the transducer is filtered to provide noise rejection outside of the acoustic signal spectrum. The filtered signal is used to indicate to an operator the liquid level in the well has been reached and the depth is read from a footage counter coupled with the wire line reel assembly at the instant the sound signal is received.

5 Claims, 3 Drawing Figures

WIRELESS REMOTE LIQUID LEVEL DETECTOR AND INDICATOR FOR WELL TESTING

BACKGROUND OF THE INVENTION

This invention relates generally to liquid level measuring devices and more specifically to liquid level indicating devices for use in oil, gas and water wells.

Present methods of electronic liquid level detection in a well employ a liquid sensor that is line connected electrically to an indicator at the surface of the wall. There are disadvantages in this type of level measuring equipment which include the requirement for special well head pressure control equipment because of the stranded single conductor cable, larger and more sophisticated reeling equipment due to the larger cable size and provision necessary for the conductor wire, and the added risk of an electrical short due to a line leak. Thus, there is a need for a simpler means for measuring the liquid level in a well that does not require an electrical link to the surface and that will operated in a pressurized well.

SUMMARY OF THE INVENTION

In view of the above need it is an object of this invention to provide a system for measuring the liquid level in a well which does not require an electrical link to the surface.

Another object of this invention is to provide a system for measuring the liquid level in a well which is simpler to deploy and operate in a pressurized well.

Other objects and many of the attendant advantages of the present invention will be obvious to those skilled in the art from the detailed description of a preferred embodiment of the invention taken in conjunction with the drawings.

In summary, the present invention relates to a wireless remote liquid level measuring device for measuring the liquid level in a well in which acoustic signals are used to communicate between a liquid level sensing probe that is lowered into the well by means of a footage calibrated wire line reel and an acoustic receiving system located at the well head. The sensing probe includes a sealed, cylindrical housing which is adapted at the lower end to sense contact with a liquid surface by means of a conductivity probe insulatably and sealably extending through the lower end of the housing into an open chamber formed by a downward extending wall portion of the housing. A conductivity sensitive circuit is provided within the sealed sensor housing which is triggered by the shunting effect of the liquid conductivity between the probe and the sensor housing. When triggered, the circuit generates electrical pulses which are applied to an acoustic signal transmitting device to generate a sharp, intense, acoustic signal which propagates up the well. An acoustic transducer located in the well casing at the well head is adapted to receive the acoustic signals and generates an electrical signal which is then amplified and filtered. The filtered signal is connected to an indicating device, such as a set of headphones, so that an operator can read the footage indicator from the footage calibrated cable reel at the onset of the acoustic signal which activates the indicating device. A meter or lamp indicator may be used instead of or to compliment the headphone indicator. To further improve the acoustic signal identification, the acoustic signal may be code modulated and the receiving system at the well head is equipped with a decoder after the filter to further enhance the acoustic signal-to-noise ratio.

DETAILED DESCRIPTION OF THE PREFERRED EMBODIMENT

Figure 1:
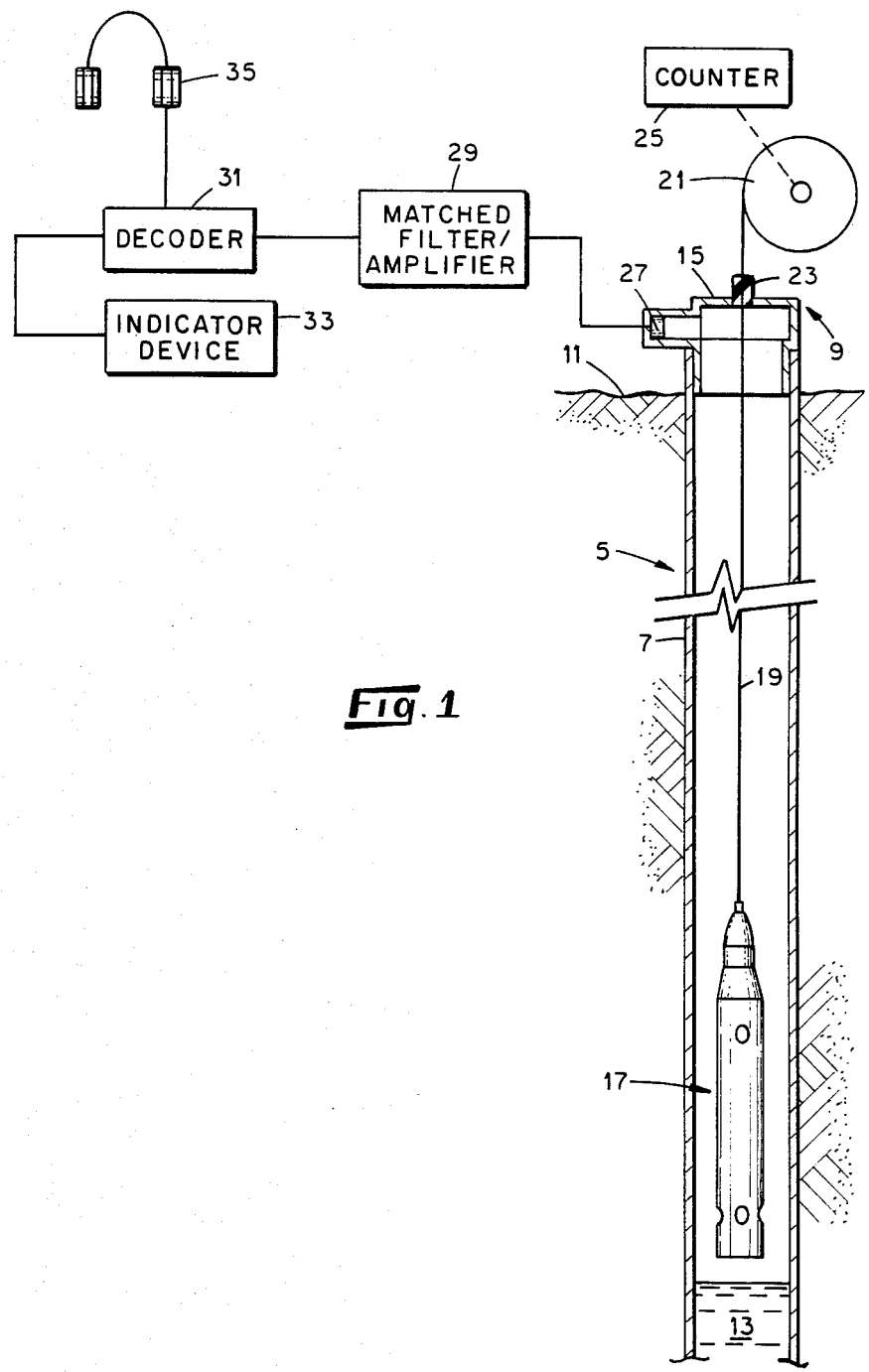
FIG. 1 is a schematic diagram of a wireless, remote liquid level measuring system for a well according to the present invention.

Referring to FIG. 1, the preferred embodiment of the invention is shown in schematic form. A deep well shown generally as 5 consists of a casing 7 which may be of steel, plastic, or other known casing materials extending from a well head 9 located at the surface 11 to at least a liquid reservoir 13 located a considerable distance below the well head 9 whose liquid level is to be measured. The well may be a pressurized well, in which case the well head is formed of a conventional pressurized well head cap assembly 15.

A liquid level sensor and transmitter are provided within a cylindrical sensor housing 17 which is attached to a steel line 19 of a wire line reel assembly 21 located above the well head 9. The cable passes through a lubricated rubber seal 23 in the well head cap 15. A footage counter 25 is attached to the wire line reel assembly to indicate the depth of the sensor housing 17 and thus the liquid level when the sensor probe engages the surface of the liquid 13 to activate an indicator.

As will be described in detail hereinbelow, the sensor housing 17 includes an acoustic transmitter which generates acoustic signals that propagate up the well which functions as a waveguide and is intercepted by a receiving transducer 27, such as a ceramic microphone or the like, mounted in the well head cap 15. The electrical signal output of the transducer 27 may be connected in a conventional manner to the input of a filter amplifier 29. The filter of the amplifier circuit 29 may take the form of a comb filter matched to the transducer signal spectrum to provide noise rejection and signal selectivity. Further, the acoustic signal may be coded according to a repeating coded pulse train to provide additional improvement in signal identification, in which case the output of the filter amplifier is connected to a decoder 31 to decode the signal. The output of the decoder may be fed to an indicator device 33, such as a meter or lamp indicator. The signal from the decoder may also be connected to headphones 35 that the wire line reel operator is wearing so that the water depth on the footage counter may be read at the instant the sound signal is received while lowering the liquid sensor.

Figure 2:
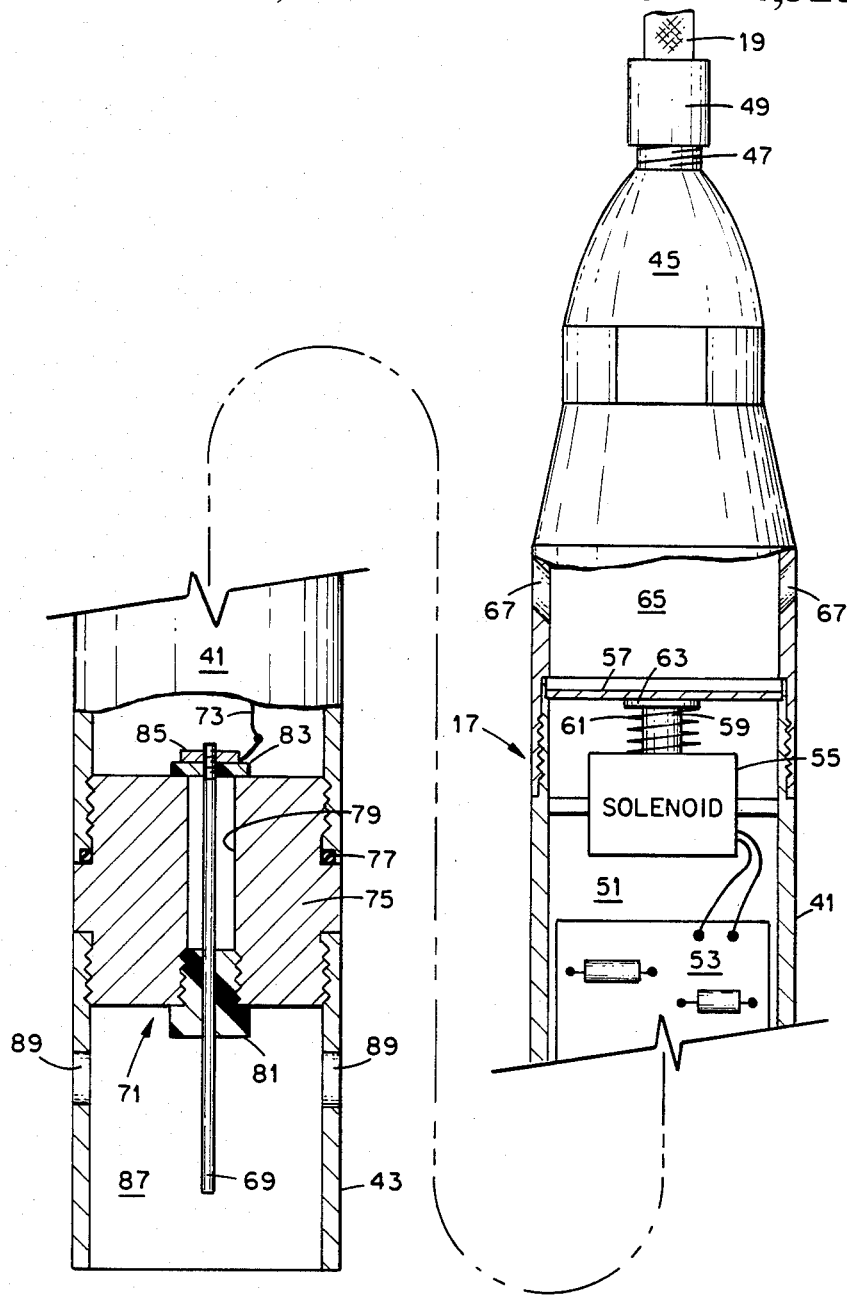
FIG. 2 is an elevational view of the liquid level sensor probe which is lowered into a well, partially broken away to show the various parts of the probe.

Referring now to FIG. 2, there is shown the liquid level sensor and acoustic transmitter within the cylindrical housing 17. The housing is formed of an electrically conductive material, such as a stainless steel pipe having an inside diameter of about 1.3 inches. The housing is formed of three sections which are threaded together to form the sensor housing having an overall length of about 19 inches. The three sections include a central electronic equipment holder section 41, a lower probe shield section 43 and an upper line head adapter section 45. The adapter section 45 necks down at the top and terminates in a threaded stud 47 which threadably engages a cable connector 49 attached to the wire line 19.

The central section 41 of the housing includes a sealed chamber 51 in which the sensor circuitry mounted on a board 53, a solenoid driver 55 and batteries (not shown) are housed. The chamber 51 is sealed at the upper end by means of a diaphragm 57 in the form of a thin metal disc sealably welded about its periphery in an annular recess of the top end of the housing section 41. The diaphragm 57 forms the acoustic signal generator from which the sound pulses are generated by the solenoid core striking the diaphragm 57 each time the solenoid ls activated. The core is spring loaded by means of a compression spring 61 positioned about the core between the solenoid housing 55 and a retainer ring 63 mounted at the end of the core 59. Each time the solenoid is activated the core 59 is pulled down and then released to strike the diaphragm 57. This generates the acoustic pulses in the form of sharp, intense, ringing sound in a chamber 65 of the line head adapter section 45. The pulses then propagate out through the openings 67 in the section 45 and up the well.

The conductivity sensing probe 69, in the form of an electrically conductive rod, is insulatably mounted in the lower end of the section 41 by means of a probe mount and seal assembly 71. The sensor or probe is connected to the transmitter circuitry by means of an electrical lead 73 connected to the top end of the probe 69. The probe mount and seal assembly 71 includes a threaded, electrically conductive sleeve 75 which threads onto the lower end of the housing section 41 and is provided with an O-ring seal 77 to prevent liquid from entering the chamber 51 around the threads. The sleeve 75 is provided with an oversize central bore 79 through which the probe 69 extends and is sealably held in place and insulated from the housing by means of a lower teflon sealing plug 81 which sealably threads into the lower end of the bore 79. The top end of the probe 69 is insulated from the housing by means of a Teflon insulating washer 83 placed between the sleeve 75 and an assembly nut 85 which threadably engages the end of the probe 69.

The probe 69 extends downward into the probe shield section 43. The shield protects the probe 69 and is open at the bottom end to allow the well liquid to enter the shield 43 chamber and contact the probe 69. Vent holes 89 are provided in the shield 43 to allow the well liquid to freely rise into the chamber 87 as the sensor is lowered into the well liquid. When the probe 69 contacts the liquid electrical conductivity takes place between the probe 69 and the housing 17 which is connected as the transmitter circuit ground.

Figure 3:
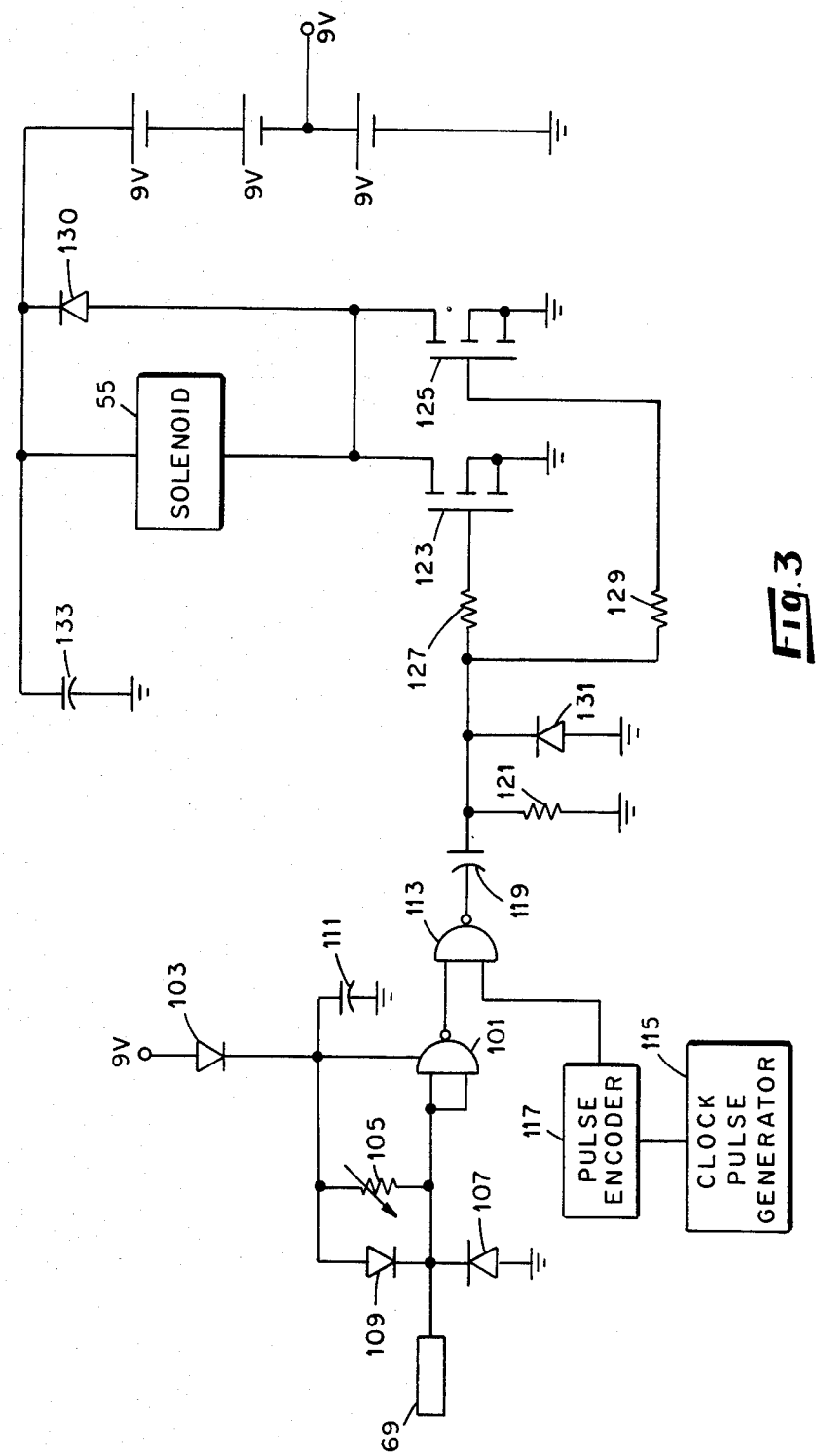
FIG. 3 is a schematic circuit diagram of the conductivity sensitive, acoustic transmitter circuit located in the probe housing of FIG. 2.

Referring now to FIG. 3, there is shown a schematic diagram of the circuit mounted on the board 53 in FIG. 2. The probe 69 is connected to the input of a CMOS gate 101 which is biased to trigger when the input falls below about 40 percent of the bias voltage (9V) which is supplied through a diode 103 to a biasing input of the gate 101. The +9V bias voltage is also applied to the probe 69 through a potentiometer 105. The potentiometer is adjusted so that the shunting effect of the conductivity of the liquid medium whose level is being measured lowers the input to gate 101 sufficient to trigger the gate. A pair of diodes 107 and 109 are provided to protect the CMOS gate 101 circuit from voltage surges produced by the operation of the solenoid 55, shown in block form in FIG. 3. Further, a capacitor 111 is connected between the cathode of diode 103 and ground potential to prevent pull down of the bias voltage (+9V) during the period the short drive pulses are applied to the solenoid.

The output of gate 101 is connected to one input of a NOR gate 113 which has its second input connected to receive clock pulses from a clock pulse generator 115. In the preferred embodiment a pulse encoder 117 is connected between the clock pulse generator 115 and the gate 113 to provide a selected, repeating coded pulse train when the gate 113 is enabled by the triggering of gate 101. The pulse encoder 117 may take various conventional forms, such as an electronic switch that gates the clock pulses on or off according to a fixed repeated sequence having a sequence fram of from 5 to 10 clock periods.

Typically, the clock pulses from the clock pulse generator 115 are positive going pulses generated at a rate of 10 pulses/second having a duration of 50 milliseconds/pulse. Each pulse from the encoder 117 has the same period. These pulses are gated through gate 113 when it is enabled in the form of a corresponding duration negative going pulses. These pulses are differentiated by a differentiator consisting of a capacitor 119 connected in series with the output of gate 113 and a resistor 121 connected between the capacitor 119 terminal opposite the gate 113 and ground potential. The differentiator limits the duration of the gated pulses to about 20 milliseconds/pulse. The output of the differentiator circuit is connected to the gate electrodes of a pair of VMOS transistors 123 and 125 through current limiting resistors 127 and 129, respectively, so that the transistors are turned "on" for the 20 millisecond duration of each differentiated pulse. To prevent overdriving of the transistors, the differentiated pulses are clipped by a diode 131 connected between the output of the differentiator and ground potential to limit the amplitude of the pulses to 0.7V.

The pair of transistors 123 and 125 provide the high energizing current necessary to drive the solenoid 55. Each transistor is connected in series with the solenoid coil by connecting the drain electrodes to one lead of the solenoid. The source electrodes of each transistor are connected to ground potential and the other lead of the solenoid is connected to a +27V voltage supply which may be provided by three 9V batteries connected in series. The batteries are housed within the chamber 51 of the probe housing 17. In order to protect the transistors from voltage surges created by the operation of the solenoid coil, a diode 130 is connected across the solenoid coil which functions to clip the inductive impulse during solenoid current turn off. This is necessary to protect the VMOS transistors against drain/source overvoltage.

A capacitor 133 is connected between the 27V supply line and ground to aid in stabilizing the supply voltage during operation of the solenoid.

In operation, the probe housing is lowered into a well by an operator to measure the liquid level, typically the water level in the well. When the water level is reached, the water entering the probe shield housing chamber 87 causes conduction to take place between the probe 69 and the housing. This lowers the voltage to the input of gate 101 allowing the coded pulses to be applied to the transistor drives 123 and 125. The transistors are turned "on" and "off" according to the application of the coded pulse train causing the solenoid to be activated during each pulse. As shown in FIG. 2, the solenoid core strikes the disc 57 producing a sharp, intense but ringing sound that propagates up the well. The transducer 27 (FIG. 1) at the well head picks up the sound which is then amplified and filtered. The filtered signal is then decoded and applied to the headphones 35 and/or indicator 33 so that the operator can note the depth on the footage counter 25 at the onset of the received signal.

Thus, it will be seen that an improved system has been provided for measuring the liquid level of a well that does not require an electrical link to the surface and that will operate in a pressurized well.

Although the invention has been illustrated by means of a description of a preferred embodiment thereof, it will be obvious to those skilled in the art that various modifications and changes may be made in the described system without deporting from the spirit and scope of the invention as set forth in the appended claims. For example, the solenoid may be replaced with a solid-state acoustic signal-generating device with appropriate acoustic coupling to the diaphragm 57 which functions as the acoustic transmitter.

We claim:

1. A liquid level measuring system for use in measuring the liquid level in a well including a bore hole extending from a well head at the earth's surface to a subterranean liquid reservoir and a casing in said bore hole, comprising:
    an electrically conductive sensing probe housing adapted to be lowered into said well, said housing including a sealed chamber;
    a conductivity sensing probe insulatably carried by said housing to sense electrical conduction through said liquid between said probe and said housing when said probe housing is lowered to the liquid level in said well;
    a pulse generating means disposed in said sealed chamber for generating excitation pulses of a preselected pattern;
    a gate circuit means disposed in said sealed chamber and responsive to conduction through said sensing probe for gating said excitation pulses to an output thereof at the onset of conduction through said probe;
    an acoustic transmitter means carried by said housing for generating acoustic signals which propagate up said well in response to said excitation pulses;
    an acoustic receiver means disposed at said well head for receiving said acoustic signals and generating an indicating signal in response to the reception of said acoustic signals; and
    a wire line reel assembly including a footage indicator and having a wire line attached to said sensing probe housing for lowering said sensing probe housing into said well to provide a depth indication of said liquid level at the indication of reception of said acoustic signal by said receiving means.

2. The liquid level measuring system as set forth in claim 1 wherein said acoustic transmitter means includes a metal diaphragm forming a wall portion of said sealed chamber of said sensing probe housing and means for acoustically actuating said diaphragm in response to said excitation pulses.

3. The liquid level measuring system as set forth in claim 2 wherein said means for acoustically actuating said diaphragm includes a solenoid having a movable core disposed to strike said diaphragm each time said solenoid is activated and a drive circuit connected between the output of said gate circuit means and said solenoid for actuating aid solenoid in response to each of said excitation pulses from said gate circuit means to generate pulsed acoustic signals according to said preselected pattern of said excitation pulses.

4. The liquid level measuring system as set forth in claim 1 wherein said pulse generating means includes a clock pulse generator, a pulse encoder connected to the output of said pulse generator for generating said preselected pattern of excitation pulses in the form of a repeating code modulated signal which generates a correspondingly coded acoustic signal and wherein said acoustic receiver means includes a decoder means for selectively receiving said coded acoustic signal to provide selective acoustic signal identification.

5. The liquid level measuring system as set forth in claim 4 wherein said sensing probe housing includes a cylindrical housing adapted at the top end thereof for connection to said cable of said wire line reel assembly, a central enclosed portion forming said sealed chamber of said housing, said central enclosed portion having a top end member formed of a metal disc forming said diaphragm, said housing having a plurality of openings in the walls thereof above said diaphragm for allowing said acoustic signal generated by said diaphragm to propagate out of said housing into said well and wherein said conductivity sensing probe includes an electrically conductive rod insulatably and sealably extending through the bottom end of said central enclosed portion of said housing along the longitudinal axis thereof and electrically connected within said central enclosed portion of said housing to the input of said gate circuit means, said cylindrical housing extending below the extent of said rod and having an opening at the bottom end thereof for freely receiving the liquid to be contacted by said probe.

* * * * *